(12) United States Patent
Callan

(10) Patent No.: US 9,116,965 B2
(45) Date of Patent: Aug. 25, 2015

(54) METHOD AND APPARATUS FOR MONITORING PERFORMANCE CHARACTERISTICS OF A SYSTEM AND IDENTIFYING FAULTS

(71) Applicant: GE Aviation Systems Limited, Gloucestershire (GB)

(72) Inventor: Robert Edward Callan, Southampton (GB)

(73) Assignee: GE Aviation Systems Limited, Cheltenham (GB)

( * ) Notice: Subject to any disclaimer, the term of this patent is extended or adjusted under 35 U.S.C. 154(b) by 157 days.

(21) Appl. No.: 13/846,482

(22) Filed: Mar. 18, 2013

(65) Prior Publication Data
US 2013/0246860 A1 Sep. 19, 2013

(30) Foreign Application Priority Data
Mar. 19, 2012 (GB) .................................. 1204789.0

(51) Int. Cl.
*G06F 11/00* (2006.01)
*G06F 11/30* (2006.01)
(Continued)

(52) U.S. Cl.
CPC .......... *G06F 11/3055* (2013.01); *G05B 23/021* (2013.01); *G06F 11/3058* (2013.01); *G06F 11/3447* (2013.01)

(58) Field of Classification Search
CPC ............ G06F 11/3058; G06F 11/3072; G06F 11/3075; G06F 11/3089; G06F 11/3447; G06F 11/3466; G06F 11/3495; G06F 11/3055; G05B 23/021

USPC ............................................. 714/26, 37, 47.1
See application file for complete search history.

(56) References Cited

U.S. PATENT DOCUMENTS 6,327,550 B1 * 12/2001 Vinberg et al. ................ 702/186
6,418,425 B1 7/2002 Maeda et al.
7,213,174 B2 5/2007 Dahlquist et al.
(Continued)

FOREIGN PATENT DOCUMENTS

GB 2476246 A 6/2011
WO 2005/008420 A2 1/2005

OTHER PUBLICATIONS

Kohonen, Teuvo, The Self-Organizing Map, Sep. 1990, IEEE, vol. 70, No. 9, pp. 1464-1480.*

(Continued)

*Primary Examiner* — Marc Duncan
(74) *Attorney, Agent, or Firm* — General Electric Company; William S. Munnerlyn

(57) ABSTRACT

A method of monitoring a system is disclosed, in particular to identify the cause of conditions outside expected operating conditions. The output of one or more sensors associated with a system is monitored and data from the one or more sensors is arranged as a plurality of modes with each mode being defined by a different condition in which the system may operate. Faulty conditions are identified by monitored data being outside one of the plurality of modes. The use of a plurality of modes enables operation of the system to be defined and tracked more precisely and false alarms may be reduced. At least one of the modes may be established to indicate a particular failure of the system. This failure mode may have a likely cause of the failure associated with it such that diagnosis and repair may be facilitated quickly and easily.

14 Claims, 4 Drawing Sheets

(51) Int. Cl.
  *G06F 11/34* (2006.01)
  *G05B 23/02* (2006.01)

(56) References Cited

U.S. PATENT DOCUMENTS

| | | | |
|---|---|---|---|
| 8,356,207 B2 * | 1/2013 | Hosek et al. | 714/26 |
| 8,676,721 B2 * | 3/2014 | Piovesan et al. | 706/11 |
| 2005/0114078 A1 | 5/2005 | Srinivasan | |
| 2005/0209767 A1 * | 9/2005 | Kim et al. | 701/100 |
| 2006/0190420 A1 | 8/2006 | Talbot | |
| 2007/0088534 A1 * | 4/2007 | MacArthur et al. | 703/17 |
| 2007/0244841 A1 | 10/2007 | Vatchkov | |
| 2008/0312783 A1 * | 12/2008 | Mansouri et al. | 701/29 |
| 2009/0037772 A1 * | 2/2009 | Wegerich et al. | 714/26 |
| 2009/0083586 A1 * | 3/2009 | Warner et al. | 714/47 |
| 2009/0100293 A1 * | 4/2009 | LaComb et al. | 714/26 |
| 2009/0299695 A1 * | 12/2009 | Subbu et al. | 702/181 |
| 2010/0198771 A1 * | 8/2010 | Khalak et al. | 706/52 |
| 2012/0284211 A1 * | 11/2012 | Datta et al. | 706/11 |
| 2013/0097463 A1 * | 4/2013 | Marvasti et al. | 714/47.1 |
| 2014/0298099 A1 * | 10/2014 | Tan et al. | 714/37 |

OTHER PUBLICATIONS

Great Britain Search Report issued in connection with GB1204789.0 dated Jul. 13, 2012.

Mast, T.A, et al., Bayesian Belief Networks for Fault Identification in Aircraft Gas Turbine Engines, Proceedings of the IEEE International Conference on Control Applications, vol. No. 01, pp. 39-44, Kohala Coast, HI, Aug. 22-27, 1999.

Bishop, "Pattern Recognition and Machine Learning", Springer, pp. 430-439, 2006.

* cited by examiner

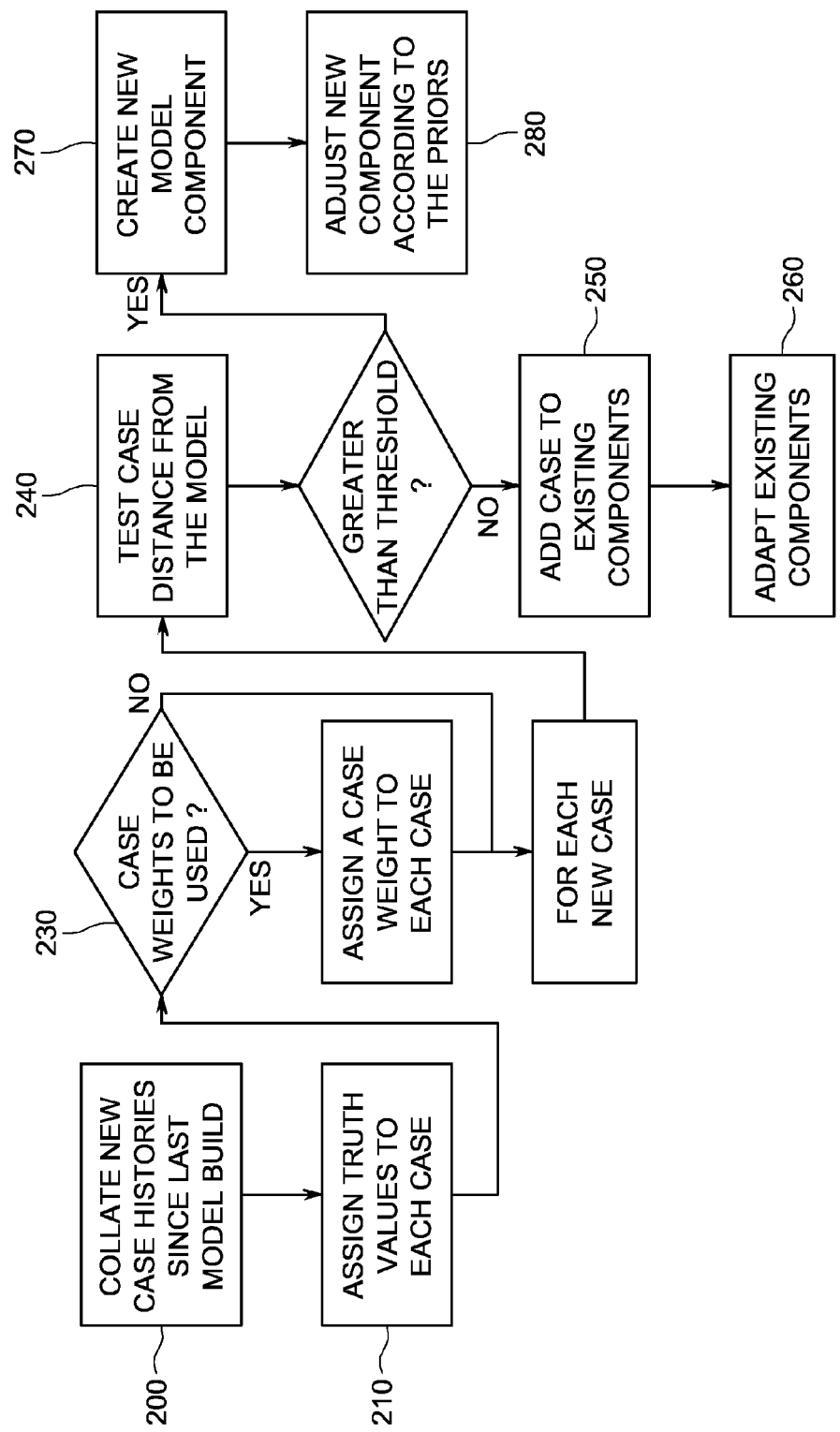

METHOD AND APPARATUS FOR MONITORING PERFORMANCE CHARACTERISTICS OF A SYSTEM AND IDENTIFYING FAULTS

BACKGROUND OF THE INVENTION

Embodiments of the present invention relate to monitoring of a system, in particular to identify the cause of conditions outside of expected operating conditions.

There are many different types of systems that may have performance characteristics that are monitored, such as mechanical systems, including for example engines, turbines, airframes etc. A system, such as an engine, may have one or more sensors to measure various aspects of the system, for example temperature, pressure, rotational speed, fluid flow etc. The outputs from the one or more sensors may be monitored to identify characteristics of the system, for example to try to identify if the system is operating outside expected conditions. For a class or system, such as the class of commercial aero engine, there will be a recognised set of failure mechanisms for non-optimal performance characteristics indicative of non-ideal operation, such as core degradation or failure of particular mechanisms. Such failures can exhibit symptoms that have a particular failure signature of a pattern displayed by various sensed parameters.

However, a problem with monitoring such systems is that when operating in unusual environments, such as in very hot conditions, very cold conditions, high altitude etc., monitoring may indicate that there is a fault when the system is, in fact, operating satisfactorily for the particular circumstances experienced.

It would be desirable to be able to monitor a system more precisely so that false alarms are reduced and problems are identified more easily.

BRIEF DESCRIPTION OF THE INVENTION

According to an embodiment of the present invention, a method is provided for monitoring a system. The method comprises monitoring the output of one or more sensors associated with the system and arranging data from the one or more sensors as a plurality of modes, each mode defined by a different condition in which the system may operate. The method further comprises identifying faulty conditions by monitored data outside one of the plurality of modes.

According to an embodiment of the present invention, an apparatus is provided for monitoring a system. The apparatus comprises at least one controller arranged to monitor the output of one or more sensors associated with the system. The controller is configured to arrange data from the one or more sensors as a plurality of modes, wherein each mode is defined by a different condition in which the system may operate and configured to identify faulty conditions by monitored data outside one of the plurality of modes.

BRIEF DESCRIPTION OF THE DRAWINGS

Embodiments of the present invention will now be described, by way of example only, with reference to the accompanying drawings, in which:

FIG. 6 shows a flow diagram illustrating an adaption process for a specific fault to be added to an existing model according to an embodiment of the invention.

DETAILED DESCRIPTION OF THE INVENTION

Figure 1:
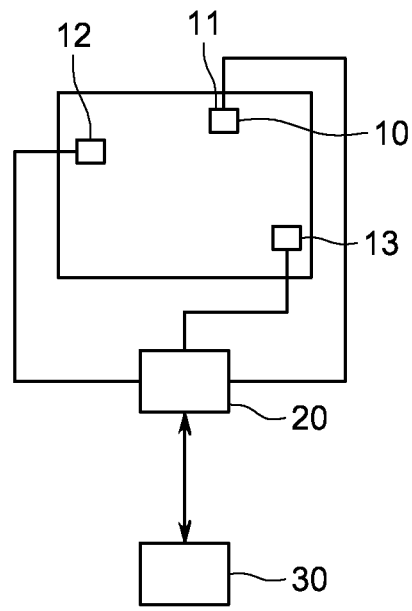
FIG. 1 shows a system with sensors being monitored according to an embodiment of the invention.

FIG. 1 shows a system 10, such as an engine, turbine etc. with one or more sensors 11, 12, 13 arranged to monitor one or more characteristics of the system 10. Such sensors often form part of a system control architecture with these sensors also being able to be utilised for monitoring the health of the system 10. Alternatively or additionally, dedicated health sensors may be used. For example, rotary aircraft use dedicated air frame accelerometers to monitor the health of the transmission. Sensors which provide analog output signals may be used for health monitoring.

The example shown in FIG. 1 includes an optional control unit 20 arranged to receive outputs from the one or more sensors 11, 12, 13. The control unit 20 may process the received signals and/or may store received data for periodic transmission to another control system 30. For example, when used with an aircraft, the system 10 may for example be an aircraft engine with one or more sensors detecting parameters of the engine, such as pressure at various points in the engine, temperature at various points in the engine, rotational speed, fuel flow, etc. The controller 20 may be arranged to store data from the one or more sensors 11, 12, 13 during a flight and to download accumulated data periodically during the flight and/or upon landing to a further controller 30 which may, for example, be arranged to receive data from a number of aircraft for analysis.

Figure 2:
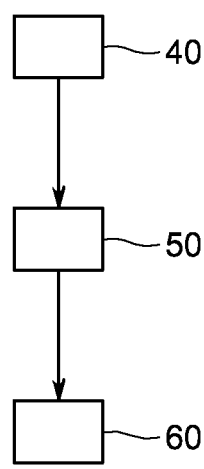
FIG. 2 is a flow diagram illustrating an example of an embodiment of the invention.

FIG. 2 illustrates an example of a method for monitoring a system, such as an aeroplane engine or air frame. In step 40, outputs from the one or more sensors 11, 12, 13 associated with the system 10 are monitored. In step 50, data from the one or more sensors are arranged as a plurality of modes. A mode may be an arrangement of data from one or more sensors 11, 12, 13 and may, for example, be modelled as a Gaussian function or a mixture of Gaussian functions. Each mode is defined by a condition in which the system may operate, such as different ambient conditions, for example, when used in different seasons, different times of day, different locations which may have different conditions, or due to variations in the physical configuration of the system, or variations in operation of the system such as when accelerating or cruising. Step 60 involves identifying faulty conditions by monitored data being outside one of the plurality of modes. The use of a plurality of modes enables operation outside expected parameters to be detected more precisely such that faults may be identified more reliably and false alarms may be reduced.

Figure 3:
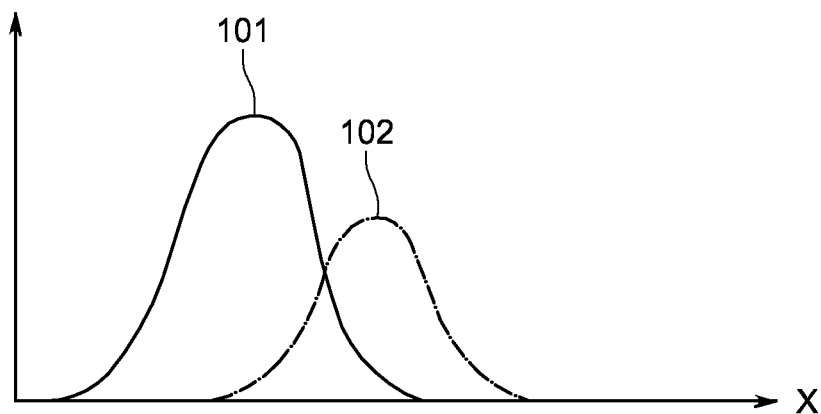
FIG. 3 shows data from the one or more sensors arranged as a plurality of modes according to an embodiment of the invention.

FIG. 3 illustrates data from the one or more sensors arranged as a plurality of modes 101, 102. In this example, data collected from the one or more sensors are modelled as single Gaussian functions with each mode 101, 102 being defined by data collected under a different condition in which the system may operate, such as a different environment, a different physical configuration (e.g. different power ratings for an engine) or a different operating condition of the system 10. For example, mode 101 may correspond to data collected from the one or more sensors from an aeroplane engine operating in the northern hemisphere and mode 102 may correspond to data collected from the one or more sensors when the aeroplane engine is operating in equatorial conditions which may be hotter and drier. Alternatively, mode 101 may correspond to data collected from an aircraft engine while it is accelerating and mode 102 may correspond to data collected from an aircraft engine during take-off.

By defining the operation of the system using a plurality of modes, with each mode being defined by a different condition in which the system may operate a more precise model of the operation of the system is provided.

Figure 4:
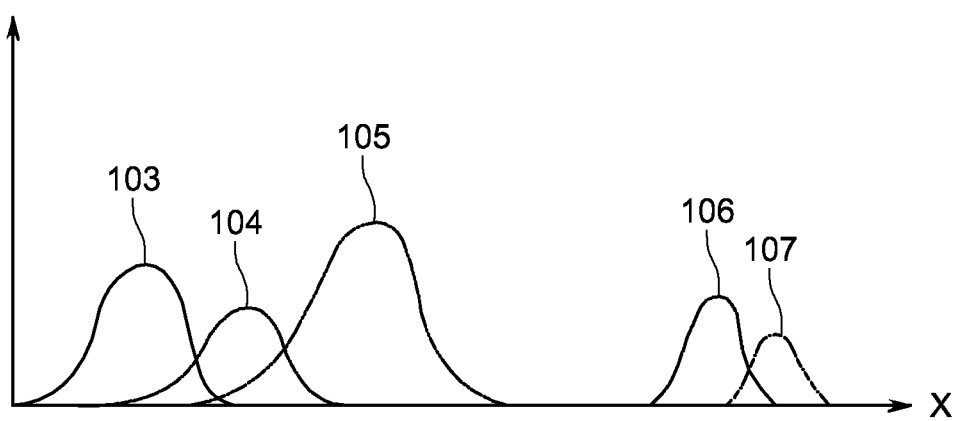
FIG. 4 shows data from one or more sensors arranged as a plurality of modes with some modes indicating a particular failure according to an embodiment of the invention.

FIG. 4 shows arranging data from one or more sensors associated with a system 10 using five modes 103, 104, 105, 106, 107. The modes 103, 104, 105 may indicate operation of the system under different conditions, each of which may be acceptable under the particular conditions being monitored such as different environmental conditions or particular physical configurations of the system. In the example of FIG. 4, one or more further modes 106, 107 have been established which are outside acceptable operating conditions. It has been found that one or more modes 106, 107 may be established which indicate particular failures. The failure modes 106, 107 may be found to have a likely cause of the failure associated with each failure mode 106, 107 such that diagnosis and repair may be facilitated quickly and easily.

A method of modelling sensor data as modes is described below with reference to FIGS. 5 and 6. A set of continuous symptomatic features may be denoted by X and each individual feature indexed by i. In this example it is assumed that the density of each $X_i$ can be modelled sufficiently using a mixture of Gaussians—this assumption is represented by equation (1) below where a conditional feature ($X_i$) is a Gaussian. The collection of all components (a component herein referring to a Gaussian function) is denoted by C. Equation (1) assumes that each $X_i$ is independent of all other features. Equation (2) represents the situation where features are assumed not to be independent. Equation (2) assumes an implicit ordering of the features with a feature being conditional on all features that have a higher rank. There are assumed to be d features and the dependency between features is represented by the weight $w_{c,j}$. When these weights are zero, equation (2) reduces to equation (1) with $w_{c,0}$ being the mean of the Gaussian.

$$p(X_i|c) = \mathcal{N}(\mu_c; \sigma_c^2) \quad (1)$$

$$p(X_i|c, X_{j \neq i}) = \mathcal{N}(w_{c,0} + \Sigma_{j=1, j \neq i}^{d} w_{c,j} X_j; \sigma_c^2) \quad (2)$$

The Gaussian components are conditional on the variable F where F is a binary discrete variable that represents the prior likelihood (i.e. no observed symptoms) of the fault (failure mode) existing (being true). Although C is modelled as conditional on F, each member of C is subject to the following constraint:

$$p(c|F=\text{true})=0 \text{ or } p(c|F=\text{false})=0.$$

In other words a component represents either F=true or F=false. Note that all entries for C corresponding to F=true must sum to 1 and similarly for F=false.

In principle, the features can include any continuous variables that are capable of detecting a fault. An example type of feature is a variable residual feature calculated by subtracting a predicted sensor value from its recorded value—this prediction could be calculated for example using a regression model with the predicted variable being modelled as dependent on other sensor variables. Such a feature will often be close to a Gaussian distribution but it may still contain multiple modes if the machine being monitored has different data acquisition regimes (i.e. variable operating conditions when measurements are recorded). The multiple modes would be represented using multiple components in variable C.

The model for a particular fault may operate by entering observations for each feature following which inference is performed to calculate the marginal for F. A value for F of true indicates the likelihood of the fault existing. The marginal for F may be calculated using standard methods for linear Gaussian models. The likelihood of F being true depends on how close the current case is to previous fault cases and how strong the features are for distinguishing the fault from the no fault cases.

A case based reasoner model may be constructed by following the steps detailed below as illustrated in the flow diagram of FIG. 5.

Step 100. For each sample, construct a historical case history—including cases representative of the fault being present and cases where there is no fault. The no fault cases will usually significantly outnumber the fault cases. For example, there may be thousands of no fault cases but only a handful of fault cases.

Step 110. For each fault, tag cases with their truth value—true (fault is present) and/or false (no fault present). Note that a case can be assigned to both truth values—in other words the case is repeated with the first case assigned true and the second case assigned false.

Step 120. For each fault, and each truth value any constraints between the continuous features may be defined. Constraints may include all features to be treated as being independent, and dependencies provided between subsets of features (a subset can be all features). For example, rotating shaft speeds may be correlated with one another but indirectly dependent on outside ambient conditions.

For each fault, and each truth value, any relationship between components may be defined. Each component may be a multivariate Gaussian and these components can be constrained to share the same volume or shape or orientation.

Step 130. For each fault and each fault truth value a case weight may be assigned. The default is a value of 1. The case weight indicates how representative the case is for the particular fault and truth value. The weight is typically a value between 0 and 1, but weights need not be restricted to this range. The weights should be used consistently over cases and truth values. For example, consider a deteriorating condition where the fault becomes more pronounced over time in which one or more diagnostic features display trend characteristics. An engineer may determine that a case acquired at the midpoint of the trend is 30% representative of the fault—that is, the case is certainly not representative of a healthy condition, but if asked to make a judgement call with reference to the fault being modelled, the engineer would say the case has a 30% chance of being the fault. In this example, the engineer would assign the case to True and give it a weighting of 0.3 (assuming the scale 0-1 is applied throughout the case histories). Note that the engineer may also duplicate the case and assign the duplicate a truth value of False and a weight of 0.7.

Step 140. If desired, a fading weight may be assigned to each case. When adapting the model corresponding to fault=true, it may be desirable to fade out the effect of older cases if the nature of the fault starts to change over time. For example, physical assets are sometimes improved. In other situations detection improves and the severity of the cases diminish because of the earlier detection. Fading of cases is achieved by applying a case weight similar to that described above in step 130.

Step 150. For each fault value and for each truth value, a linear Gaussian model is constructed, as shown for example in FIGS. 3 and 4. The Gaussian model can be trained using a method, such as Expectation Maximization (EM). Separate models are built corresponding to the truth values for the fault. After the models are learned, they can be linked to variable F.

The reasoner construction method described above assumes that all case histories exist. In practice, the cases evolve over time and may incorporate a case based reasoner that is able to capture and adapt to new experiences. The method described below allows for model adaptation. For the case based reasoner described here the rate of adaptation differs between the models corresponding to the Fault truth values True and False. When the no fault cases dominate the case histories, the corresponding Gaussian model only needs updating periodically whereas the fault=true Gaussian model needs updating after each new case. The philosophy of the method is that the reasoner's view of a case can change over time with experience. Therefore the adaptation phase could involve learning both models from scratch rather than adapting the existing models—building new models from scratch assumes that a robust model construction method has been applied in step 150. For mixture model learning, it is assumed that multiple models were generated using different random seeds and a model selected that best represents the training data.

A reasoner can be constructed with any number of fault cases. If the model is constructed after seeing the first fault case, the model corresponding to fault=true has only one component. The variance of the X features for this component would be zero so a prior for the variances is used. For example, this prior may be set to 5% of the variances of the population of no fault cases. This prior is then gradually modified as new fault cases are seen. The model for the fault cases assumes a single component Gaussian. If at some point in time additional components provide a better fit to the fault cases, then additional components can be used.

Figure 5:
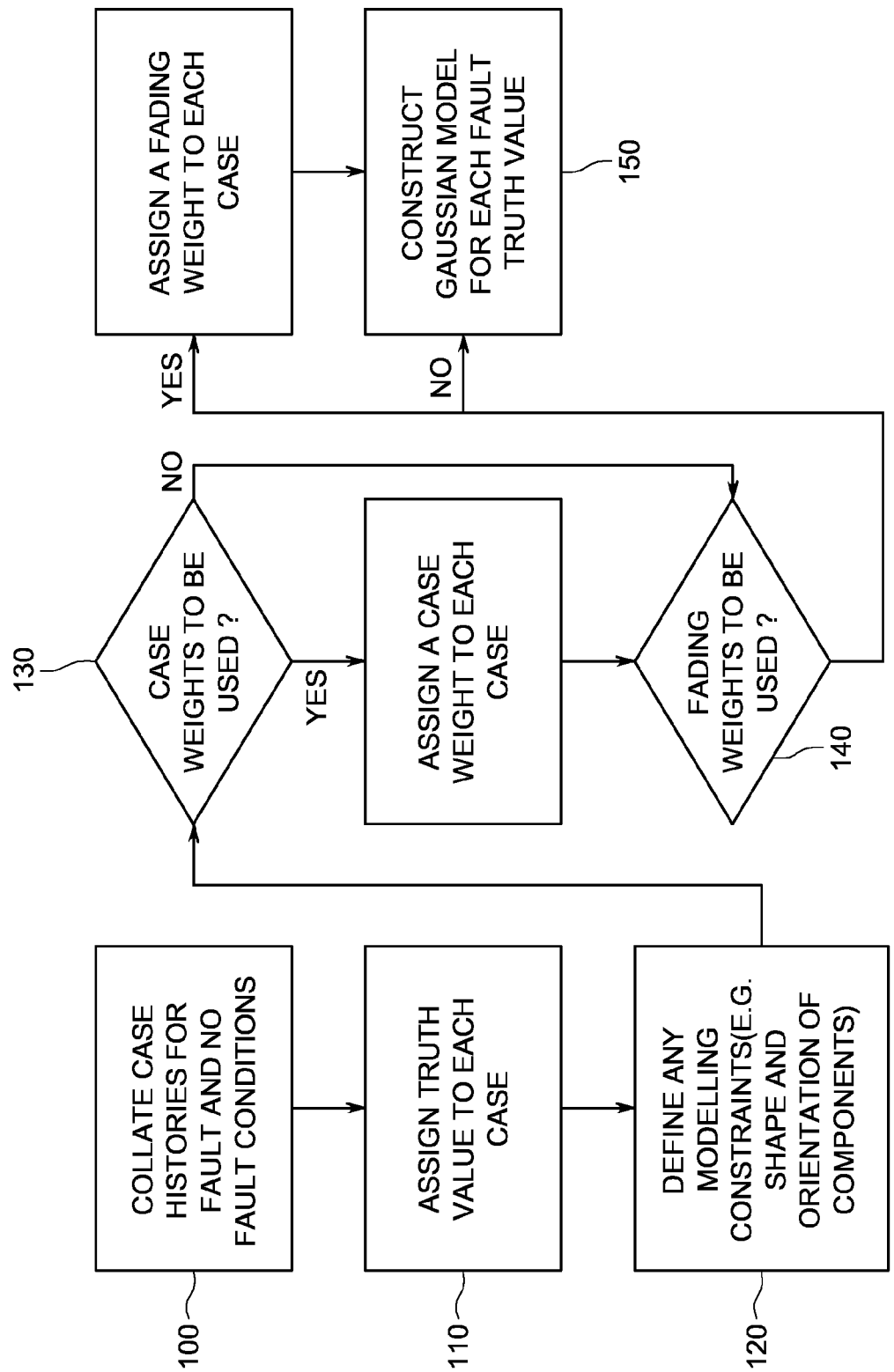
FIG. 5 is a flow diagram indicating possible processing that may be applied to data from a sensor according to an embodiment of the invention.

When the Gaussian models are constructed as in step 150 of FIG. 5, a number of different priors may be applied. These priors make adjustments to a model's components. There is a prior for the component's support (how many cases a component represents) and priors for the variance of each continuous feature. The impact of the priors can be adjusted. There is also an option not to use any priors. The priors for the model corresponding to the fault=true usually play a key role when the model is initially constructed. The method described herein is designed to allow reasoning to be performed on new data even when a single fault case has been experienced. The impact of the priors can gradually be reduced as new fault cases are added to a component.

FIG. 6 shows an adaptation process for a specific fault to be added to an existing model. At step 200, new case histories since the last model build are collated. It is optional as to whether the adaptation is applied to both or only one of the truth value models. If for example only the fault=true model is adapted then all cases have the same truth value assigned. Adaptation either involves assigning a new case (or cases) to existing model components or creating a new model component. The adaptation is used infrequently for the fault=false cases because this model is designed to represent healthy data and the generation of a new component could be triggered by admitting outliers (anomalies). So adaptation is usually reserved for the fault=true model.

Step 210 of assigning truth values to each case and step 230 of assigning a case weight correspond to steps 110 and 130, respectively, of FIG. 5.

The decision whether or not to create a new component at step 270 depends on a distance measure from the case to the existing model (step 240). Any suitable distance metric can be applied. Two metrics employed to date include the log likelihood and the Kullback-Leibler divergence. The model is used to calculate the log likelihood for a new case (usually fault case). The log likelihood is a standard measure for mixture models and indicates how well a model represents the data. The log likelihood for the new case is compared to the log likelihood for existing cases. If there is a clear difference in log likelihood value for the new case then an additional model component may be required at step 270. The Kullback-Leibler divergence is a standard measure for comparing two probability distributions. Provided the existing model contains a few (e.g. 5 or more) fault cases, this metric can be used by randomly generating 2 candidate densities by randomly partitioning the existing fault cases. The divergence between these 2 densities is calculated. The process is repeated (and will include all possible subsets if the sample size is small). The "candidate divergence" is then calculated from the existing model and a new candidate component generated from the new case. If the candidate divergence is significantly different to the sampled divergences then a new model component may be required as shown at step 270. The new model component may be adjusted according to the priors at step 280.

If the distance measure from the case to the existing model (step 240) is less than a threshold, the case may be added to the existing components (step 250) and the existing components adapted accordingly.

Many variations may be made to the examples described above while still falling within the scope of the embodiments of the present invention. For example, in an embodiment, a single sensor associated with a system may be monitored or two or more sensors may be monitored as is appropriate for the particular system being monitored. If a model is constructed in accordance with FIG. 5 or FIG. 6, one or more of the indicated steps may be omitted if not required, such as using case weights and fading weights and any further steps as may be appropriate for a particular example may be added.

In an embodiment, each mode may be defined by a different condition, such as different ambient conditions. For example, when used in different seasons, different times of day, different locations, variations in the physical configuration of the system such as with different components and different operating conditions such as high speed operation or low speed operation. The use of a plurality of modes enables operation of the system to be defined and tracked more precisely so that operation outside expected parameters may be detected more precisely and false alarm signals may be reduced.

In an embodiment, one or more modes may be established to indicate particular failures, particularly as more data is acquired for a particular system. These failure modes may each have a likely cause of the failure associated with each mode such that diagnosis and repair may be facilitated more quickly and easily.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for monitoring a system, the method comprising:
monitoring an output data from one or more sensors associated with the system;
arranging the output data from the one or more sensors as a plurality of modes, each mode defined by a condition in which the system may operate, wherein the output data is modelled by assigning a fading weight to each output data sample; and
identifying faulty conditions by the monitored output data outside one of the plurality of modes.

2. The method according to claim 1, wherein the plurality of modes are each defined by a different ambient condition in which the system may operate.

3. The method according to claim 1, wherein each of the plurality of modes corresponds to a different physical configuration of the system.

4. The method according claim 1, wherein each of the plurality of modes corresponds to different operating conditions of the system.

5. The method according to claim 1, wherein at least one mode is indicative of a particular failure.

6. The method according to claim 1, wherein at least one mode is a failure mode indicative of a particular failure and each failure mode has a likely cause of the failure associated with it.

7. The method according to claim 1, wherein the output data is modelled using variables determined by calculating a difference between the sensed output data and at least one predicted value.

8. The method according to claim 1, wherein the output data is modelled by assigning a truth value to each data sample.

9. The method according to claim 1, wherein the output data is modelled by assigning a case weight to each data sample.

10. The method according to claim 1, wherein each output data sample is used to construct a Gaussian model, with each Gaussian function corresponding to a mode.

11. The method according to claim 1, wherein the output data from the one or more sensors is used to adapt an existing model.

12. The method according to claim 1, wherein a new component is added to the model if a new sample is a greater distance from a corresponding sample of the output data in the model than a predefined threshold.

13. An apparatus for monitoring a system, the apparatus comprising:
at least one controller arranged to monitor an output data of or more sensors associated with a system,
the controller configured to at least (i) arrange the output data from one or more sensors as a plurality of modes, wherein each mode is defined by a different condition in which the system may operate and the output data is modelled by assigning a fading weight to each output data sample, and (ii) identify faulty conditions by the monitored output data outside one of the plurality of modes.

14. An apparatus according to claim 13, wherein at least one of the modes is established to indicate a failure associated with the system.

* * * * *

UNITED STATES PATENT AND TRADEMARK OFFICE
CERTIFICATE OF CORRECTION

PATENT NO.         : 9,116,965 B2
APPLICATION NO.    : 13/846482
DATED              : August 25, 2015
INVENTOR(S)        : Callan It is certified that error appears in the above-identified patent and that said Letters Patent is hereby corrected as shown below:

On the title page

Item 71, under "Applicant", in Column 1, Line 2, delete "Gloucestershire (GB)" and insert -- Cheltenham, Gloucestershire (GB) --, therefor.

Item 73, under "Assignee", in Column 1, Line 2, delete "Cheltenham (GB)" and insert -- Cheltenham, Gloucestershire (GB) --, therefor.

In the claims

In Column 7, Line 25, in Claim 4, delete "according claim" and insert -- according to claim --, therefor.

In Column 8, Lines 21-22, in Claim 13, delete "of or" and insert -- of one or --, therefor.

In Column 8, Line 31, in Claim 14, delete "An" and insert -- The --, therefor.

Signed and Sealed this
Fifth Day of April, 2016

Michelle K. Lee
*Director of the United States Patent and Trademark Office*